United States Patent
Tokuyoshi (12) 
(10) Patent No.: US 10,115,228 B2
(45) Date of Patent: Oct. 30, 2018

(54) RECORDING MEDIUM, LUMINANCE COMPUTATION APPARATUS, AND LUMINANCE COMPUTATION METHOD

(71) Applicant: SQUARE ENIX CO., LTD., Tokyo (JP)

(72) Inventor: Yusuke Tokuyoshi, Tokyo (JP)

(73) Assignee: SQUARE ENIX CO., LTD., Tokyo (JP)

( * ) Notice: Subject to any disclaimer, the term of this patent is extended or adjusted under 35 U.S.C. 154(b) by 0 days.

(21) Appl. No.: 15/174,077

(22) Filed: Jun. 6, 2016

(65) Prior Publication Data

US 2016/0371881 A1 Dec. 22, 2016

Related U.S. Application Data

(60) Provisional application No. 62/182,762, filed on Jun. 22, 2015.

(30) Foreign Application Priority Data

Sep. 29, 2015 (JP) ................................ 2015-192187

(51) Int. Cl.
*G06T 15/06* (2011.01)
*G06T 15/50* (2011.01)
*G06T 15/04* (2011.01)

(52) U.S. Cl.
CPC ............ *G06T 15/506* (2013.01); *G06T 15/04* (2013.01); *G06T 2215/12* (2013.01)

(58) Field of Classification Search
CPC ..... G06T 15/506; G06T 3/0012; G06T 11/60; G06T 15/50; G06T 3/40; G06T 15/06; G06T 15/005; G06T 15/04; G06T 2215/12; G06T 15/60; G06T 15/80
See application file for complete search history.

(56) References Cited

U.S. PATENT DOCUMENTS

2013/0335406 A1\* 12/2013 Tabellion .............. G06T 17/005
345/419

OTHER PUBLICATIONS

Bruce Walter, Sebastian Fernandez, Adam Arbree, Kavita Bala, Michael Donikian, and Donald Greenberg. Lightcuts: a scalable approach to illumination. ACM Transactions on Graphics (SIGGRAPH), 24(3):1098-1107, Jul. 2005.*

(Continued)

*Primary Examiner* — Ke Xiao
*Assistant Examiner* — Raffi Isanians
(74) *Attorney, Agent, or Firm* — Greenblum & Bernstein, P.L.C.

(57) ABSTRACT

In an importance map of the scene that is generated to correspond to the two-dimensional map, a composite region is set such that the summation of the importances becomes a predetermined value for each of the predetermined number of composite virtual lights, and for each of the predetermined number of composite virtual lights, a parameter of the composite virtual light is decided based on a region of the two-dimensional map that corresponds to the composite region that was set. Here, the composite region is set so that a value obtained by totaling, for the predetermined number of the composite virtual lights, the summation of the importances for the composite region set for each composite virtual light, corresponds to a summation of the importances of entire region of the importance map.

9 Claims, 6 Drawing Sheets

(56) References Cited

OTHER PUBLICATIONS

Davidovic T., Krivanek J., Hasan M., Slusallek P., Balak.: Combining global and local virtual lights for detailed glossyillumination. ACM Transactions on Graphics (Proc. SIGGRAPHAsia) 29, 6 (2010), 143:1-143:8.*
Prutkin, R., Kaplanyan, A., & Dachsbacher, C. (Feb. 2012). Reflective Shadow Map Clustering for Real-Time Global Illumination. In Eurographics (Short Papers) (pp. 9-12).*
Khan, S. U., Al-Shahry, M., & Ingler, W. B. (2002). Efficient photochemical water splitting by a chemically modified n-TiO2. science, 297(5590), 2243-2245.*
Extended European Search Report for European Patent Application No. 16172339.0, dated Nov. 14, 2016.
Mark Colbert et al., "GPU Gems 3: Chapter 20", Jan. 1, 2007, XP055316659, ISBN: 9780321545428, Retrieved from the Internet: URL:https://developer.nvidia.com/gpugems/GPUGems3/gpugems3_ch20.html (retrieved on Nov. 4, 2016).
Jaroslav Krivanek, et al., "Real-time shading with filtered importance sampling", Eurographics Symposium on Rendering 2008, vol. 27, No. 4, pp. 1147-1154.
Roman Prutkin, et al., "Reflective shadow map clustering for real-time global illumination", Eurographics 2012 Short Papers, pp. 9-12.
Yusuke Tokuyoshi, "Virtual spherical gaussian lights for real-time glossy indirect illumination", SIGGRAPH Asia 2014 Technical Briefs, Article No. 17, pp. 1-4.

\* cited by examiner

RECORDING MEDIUM, LUMINANCE COMPUTATION APPARATUS, AND LUMINANCE COMPUTATION METHOD

CLAIM FOR PRIORITY

This application claims the priority benefit of U.S. provisional application 61/182,762,filed Jun. 22, 2015, and Japanese application 2015-192187, filed Sep. 29, 2015, the contents of which is expressly incorporated by reference herein in their entireties.

BACKGROUND OF THE INVENTION

Field of the Invention

The present invention relates to a recording medium, a luminance computation apparatus, and a luminance computation method, and particularly to a technique for reducing a computation amount for a luminance computation.

Description of the Related Art

In recent years, in the field of rendering of graphics, application of global illumination to perform a more realistic graphics expression has been conducted. Because computation for global illumination performs computation that considers light paths from various lights for one point, a computation amount can increase in accordance with a reproduction precision. Because time constraints are involved in the field of real-time rendering in particular, various methods to reduce a computation amount have been proposed for global illumination.

As one method, there is a method that uses a Reflective Shadow Map (RSM) that includes, for each point of an object illuminated by a light, determined positions and parameters of a Bidirectional Reflectance Distribution Function (BRDF). With the method that uses the RSM, each pixel of the RSM indicates various parameters of indirect illumination (Virtual Point Light (VPL)) caused by lights defined in a scene, and by referencing the pixels, it is possible to calculate a contribution from each VPL to a radiance of a point that is the target of the computation.

However, because considering all pixels of the RSM as VPLs (summing contributions of all VPLs in a computation of radiance) means performing a computation even for a VPL having a low level of contribution, usually a scheme in which a random sampling is performed to obtain an approximate solution is employed. Specifically, for a point x on an object surface which is the target of computation, because a computation amount can become large even if the rendering equation for obtaining the radiance $L(x,\omega)$ for a direction $\omega$ to a viewpoint, $$L(x,\omega)=\int_\Omega L_{in}(x,\omega')f(x,\omega,\omega')(\omega'\cdot n)d\omega'$$

(where $L_{in}(x,\omega')$ is incident radiance, and f and n are the BRDF and normal of the object surface) is limited to a resolution level for the RSM, a Monte Carlo integral that performs weight averaging by a random sampling of VPLs is employed.

Roman Prutkin, et al., "Reflective shadow map clustering for real-time global illumination", Eurographics 2012 Short Papers, pp. 9-12 discloses a method that defines an importance map that expresses a two-dimensional probability density function (PDF) based on an RSM (a probability density is something that normalizes importance), uses k-means clustering to classify the map into a predetermined number of clusters (a higher importance is more finely classified), and approximates VPLs of each region corresponding to a cluster to one virtual light for which it is possible to analytically compute a radiance, to thereby reduce a resolution of the RSM, and reduce a computation amount for radiance.

However, because the k-means clustering recited in Prutkin performs processing to calculate a distance to each cluster for each pixel, a computation amount is typically large. Processing that uses k-means clustering to cluster pixels included in an image typically uses only a distance between pixels as a scale for the distance between a pixel and a cluster, and it is possible to classify pixels in the image into the shape of a Voronoi diagram, which as in FIG. 4 has no overlapping or gaps. In Prutkin, optimization of computation is performed by introducing different scales for such k-means clustering, but it was necessary to have a computation amount in accordance with a number of clusters for the classifying and the number of pixels of the importance map, and this was a form for which acceleration of the computation was difficult.

SUMMARY OF THE INVENTION

At least one embodiment of the present invention was conceived in view of the above problem, and has as an object to provide a recording medium, a luminance computation apparatus, and a luminance computation method for reducing a computation amount for luminance computation.

A present invention in its first aspect provides a non-transitory computer-readable recording medium on which is recorded a program for causing a computer to, for a luminance computation performed based on a two-dimensional map indicating a space distribution, of a plurality of virtual lights determined for a global illumination of a scene, and a parameter of each virtual light, the luminance computation being performed to approximate the plurality of virtual lights to a smaller predetermined number of composite virtual lights, perform processing to decide a parameter of each of the predetermined number of composite virtual lights, wherein the program comprises: processing for obtaining an importance map of the scene that is generated to correspond to the two-dimensional map, the importance map having a data structure from which a summation of importances of a requested region can be obtained; processing for setting in the importance map a composite region such that the summation of the importances becomes a predetermined value for each of the predetermined number of composite virtual lights; and processing for deciding, for each of the predetermined number of composite virtual lights, a parameter of the composite virtual light based on a region of the two-dimensional map that corresponds to the set composite region, wherein a value obtained by totaling, for each of the predetermined number of the composite virtual lights, the summation of the importances for the composite region set for each composite virtual light, corresponds to a summation of the importances of entire region of the importance map.

The present invention in its second aspect provides a luminance computation apparatus for executing a luminance computation performed based on a two-dimensional map indicating a space distribution, of a plurality of virtual lights determined for a global illumination of a scene, and a parameter of each virtual light, the luminance computation being performed to approximate the plurality of virtual lights to a smaller predetermined number of composite virtual lights, the apparatus comprising: an obtainer which is able to obtain an importance map of the scene that is generated to correspond to the two-dimensional map, the importance map having a data structure from which a summation of importances of a requested region can be obtained; a setter which is able to set in the importance map a composite region such that the summation of the importances becomes a predetermined value for each of the predetermined number of composite virtual lights; and a decider which is able to decide, for each of the predetermined number of composite virtual lights, a parameter of the composite virtual light based on a region of the two-dimensional map that corresponds to the set composite region, wherein a value obtained by totaling, for each of the predetermined number of the composite virtual lights, the summation of the importances for the composite region set for each composite virtual light, corresponds to a summation of the importances of entire region of the importance map.

The present invention in its third aspect provides a luminance computation method for executing a luminance computation performed based on a two-dimensional map indicating a space distribution, of a plurality of virtual lights determined for a global illumination of a scene, and a parameter of each virtual light, the luminance computation being performed to approximate the plurality of virtual lights to a smaller predetermined number of composite virtual lights, the method comprising: obtaining an importance map of the scene that is generated to correspond to the two-dimensional map, the importance map having a data structure from which a summation of importances of a requested region can be obtained; setting in the importance map a composite region such that the summation of the importances becomes a predetermined value for each of the predetermined number of composite virtual lights; and deciding, for each of the predetermined number of composite virtual lights, a parameter of the composite virtual light based on a region of the two-dimensional map that corresponds to the set composite region, wherein a value obtained by totaling, for each of the predetermined number of the composite virtual lights, the summation of the importances for the composite region set for each composite virtual light, corresponds to a summation of the importances of entire region of the importance map.

Further features of the present invention will become apparent from the following description of exemplary embodiments (with reference to the attached drawings).

DESCRIPTION OF THE EMBODIMENTS

[Embodiments]

Exemplary embodiments of the present invention will be explained hereinafter in detail, with reference to the drawings. Note, for an embodiment explained below, an example where the present invention is applied to a PC capable of rendering a screen for which real-time global illumination is applied, as an example of a luminance computation apparatus, is explained. However, the present invention is capable of being applied to any device which is capable of performing computation of a radiance even if it lacks a rendering function.

<Configuration of a PC 100>

Figure 1:
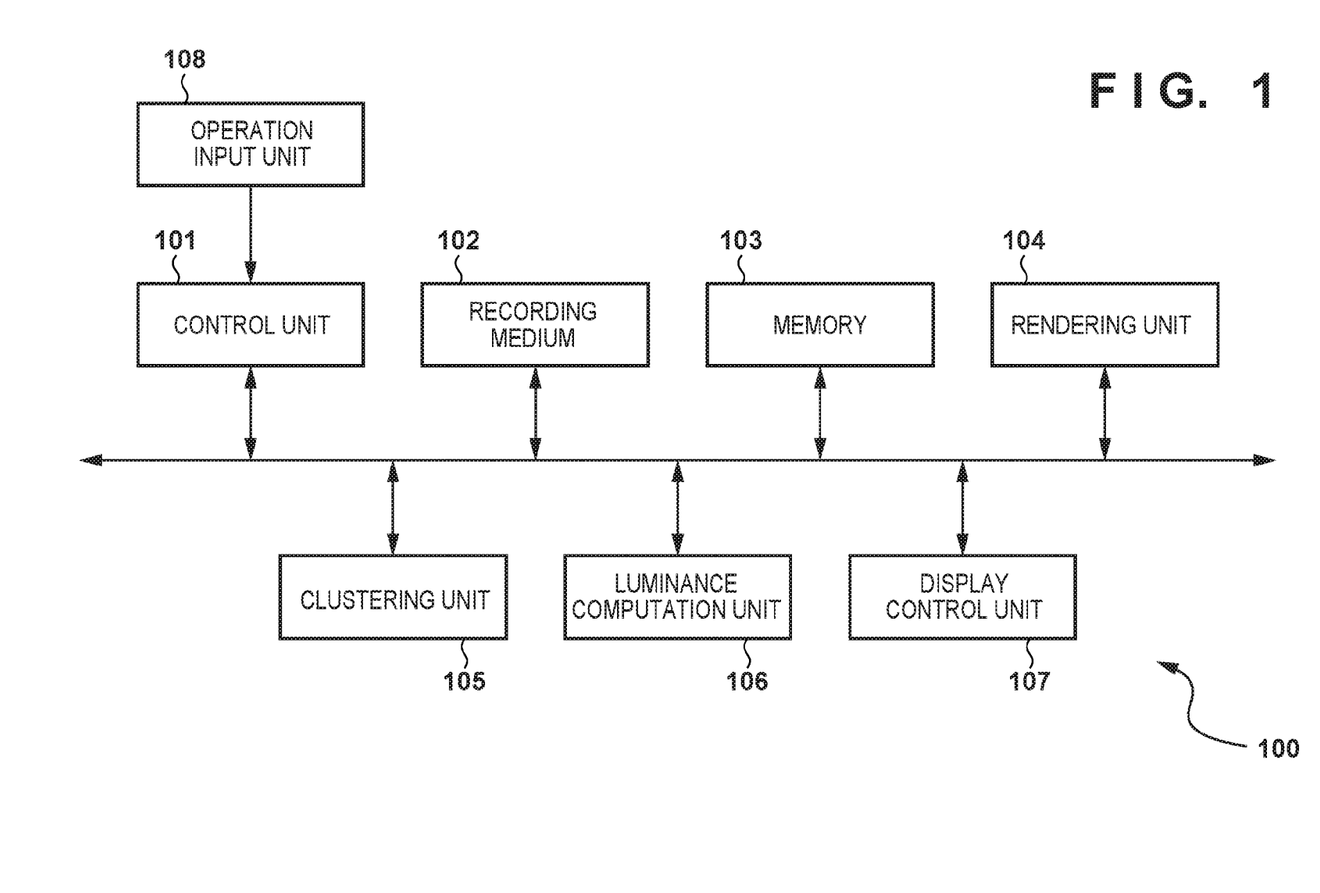
FIG. 1 is a block diagram for showing a functional configuration of a PC 100 according to an embodiment of the present invention.

FIG. 1 is a block diagram for showing a functional configuration of a PC 100 according to embodiments of the present invention.

A control unit 101 is for example a CPU, and controls an operation of each block provided in the PC 100. The control unit 101 controls operation of each block by reading an operation program of the respective block which is stored in a recording medium 102, loading the program into a memory 103, and executing the program.

The recording medium 102 is a non-volatile storage apparatus configured to be able to hold data permanently, and includes, for example, a rewritable ROM, an HDD, or a detachable recording medium such as optical media that can be read by being loaded into a predetermined optical drive. The recording medium 102 stores, for example, a program or application data involved in a global illumination computation, as well as parameters required for operation of each block, in addition to an operation program for each block provided in the PC 100.

The memory 103 is a volatile storage apparatus such as a RAM, for example. The memory 103 is not just used as a loading region for operation programs for the blocks, but also as a storage region for temporarily storing intermediate data output in operation of the blocks.

A rendering unit 104 is a rendering apparatus, such as a GPU, for example, for performing rendering processing for a game screen. The rendering unit 104 renders game screens in accordance with rendering commands generated as a result of processing for a game. In addition, because a GPU excels at a capability for parallel computational processing of a plurality of processes, the rendering unit 104 may perform processing executed by the control unit 101, a clustering unit 105, or a luminance computation unit 106 in their place. The rendering unit 104 also generates an importance map and an RSM (or an environment map) for a scene to be rendered. Importance (proportional to a probability density) may be determined based on any criteria, for example a luminance level, a distance to a point to be rendered, or the like. Note, in the following explanation, in particular explanation is given by mainly using "importance" when making reference from an aspect of a level of importance in a luminance computation, and mainly using "probability density" when making reference from an aspect of a level of contribution considered in a luminance computation, but the two may be understood as terms used to mean the same thing.

The clustering unit 105 performs processing for clustering a plurality of virtual lights (VPLs) defined in a scene and for generating a predetermined number of lights which are the targets of computation in later explained luminance computation processing. In the luminance computation processing of the present embodiment, a contribution is considered assuming only lights after composite virtual light generation processing, that is only lights of the number of clusters, as targets of the computation (sampling target). In other words, for clusters which are sampling targets in luminance computation processing, a plurality of VPLs in each cluster are approximated as one virtual light using parameters corresponding to a summation of the radiances of the VPLs in the respective cluster and the size of the respective cluster, so that the luminance of all VPLs defined in each cluster can be expressed. In the luminance computation processing performed in the present embodiment, information (various parameters) of a light in a scene is obtained based on an image, such as an RSM or an environment map as described above.

The luminance computation unit 106 executes later explained luminance computation processing and obtains, in units of pixels, a luminance of each object arranged in a game screen to be rendered by the rendering unit 104. That is, the luminance computation unit 106 computes a luminance of each pixel by adding a contribution from the light (a composite virtual light) generated for each cluster obtained as a result of clustering.

A display control unit 107 performs display control for outputting game screens rendered by the luminance computation unit 106 with a predetermined frequency (frame rate) to a display apparatus connected to the PC 100. The display apparatus may be externally connected to the PC 100, or may be built-into the same housing as the PC 100.

An operation input unit 108 is a user interface that the PC 100 has for performing an operation input, and is, for example, an analog stick or a button, a keyboard, a mouse, a touch detection sensor, or the like. Upon detecting a performed operation input, the operation input unit 108 transmits information for identifying the operation input to the control unit 101. In the PC 100 of the present embodiment, various processing in response to the operation input is performed when performing screen rendering for every frame, because the rendering content of a screen of display output can change in accordance with an operation input received by the operation input unit 108.

<Solution Method Overview>

Explanation is given below of a clustering method that generates composite virtual lights for which a suitable luminance expression is performed while reducing the number of lights for which contribution is considered in luminance computation processing, in order to solve the above described problem. In this method, in the clustering, obtainment is performed from an average of parameters of VPLs in a cluster in order to also optimize parameter obtainment of composite virtual lights without using k-means clustering in order to reduce a computation amount.

<FIS: Filtered Importance Sampling>

By the way, for reducing a distribution in a Monte Carlo integration relating to a luminance computation, FIS (Filtered Importance Sampling) is proposed by Krivanek et al. (Jaroslav Krivanek, et al., "Real-time shading with filtered importance sampling", Eurographics Symposium on Rendering 2008, Volume 27, Number 4, pp. 1147-1154).

Importance sampling used by Krivanek et al. defines a probability density function (PDF) according to a distribution of reflection directions of computation target points (BRDF), and decides a direction for performing sampling based on this. Specifically, dense sampling is performed for a direction with a high probability density, and coarse sampling is performed for a direction with a low probability density. In the method of Krivanek et al., parameter obtainment from an environment map (an image which maps a sphere) is further performed according to a probability density of a sampling direction set for sampling. At this time, the environment map is mipmapped in advance, and a value of a pixel for a region of a sampling direction is obtained as a light parameter from the environment map of a mip level corresponding to the probability density of the sampling direction. In other words, in the method of Krivanek et al., reduction of a computation amount is realized because the environment map is filtered in advance (mipmapped), and parameters can be obtained from a pixel (having a pixel value based on an average of the region) of a mip level corresponding to a region of an area (the weighting is higher the higher the probability density is, and therefore the area becomes smaller) in accordance with a probability density at a time of sampling.

For more detail, in sampling corresponding to normal importance (importance sampling), because the rendering equation is approximated as $$\overline{L} = \sum_{i}^{N} \frac{f(\omega_i)L_e(\omega_i)}{N \cdot p(\omega_i)}$$

(where, $\omega_i$ is a vector of the sampling direction, f is a product of a BRDF and a cosine term, Le is a radiance obtained from the environment map, and p is a PDF), so ideally $$p(\omega_i) \propto f(\omega_i)L_e(\omega_i)$$

However, it is difficult to efficiently calculate a PDF that satisfies the above equations. Thus, a simple PDF of $$p(\omega_i) \propto f(\omega_i)$$

is often used. However, in a case where the luminance is obtained from the an entire periphery environment map given by an image, a dynamic range of the environment map can become wide and therefore the above condition is difficult to meet, and this becomes a cause of noise.

On the other hand, in FIS, a mip level $l_i$ is considered, so the rendering equation is approximated as $$\overline{L} \approx \sum_{i}^{N} \frac{f(\omega_i)L_e(\omega_i, l_i)}{N \cdot p(\omega_i)}$$

Note, if a maximum mip level (mip level of a lowest layer (high resolution)) is $l_{max}$, $l_i$ is $$l_i = l_{max} - \frac{1}{2}\log_2(N \cdot p(\omega_i))$$

In other words, if a density ($N \cdot p(\omega_i)$) is high, value obtainment is performed from a high resolution environment map, and if a density is low, value obtainment is performed from a low resolution environment map. Here, because a filtered value of a corresponding region is obtained from a mipmap, for $L_e$ one value may be referenced for one sampling direction. In FIS, in a case of $$p(\omega_i) \propto f(\omega_i)$$

estimated values are only filtered values, so noise can be reduced.

In this way, in the FIS by Krivanek et al., for a pixel on a screen for a scene to be rendered, a computation amount is reduced by causing mip levels of an environment map that is sampled to differ in accordance with the BRDF of an object rendered on the pixel. In contrast, the present invention realizes reduction of a computation amount while guaranteeing a suitable luminance computation result in the clustering of lights in accordance with an importance map.

<FIS Application to Light Clustering>

Figure 4:
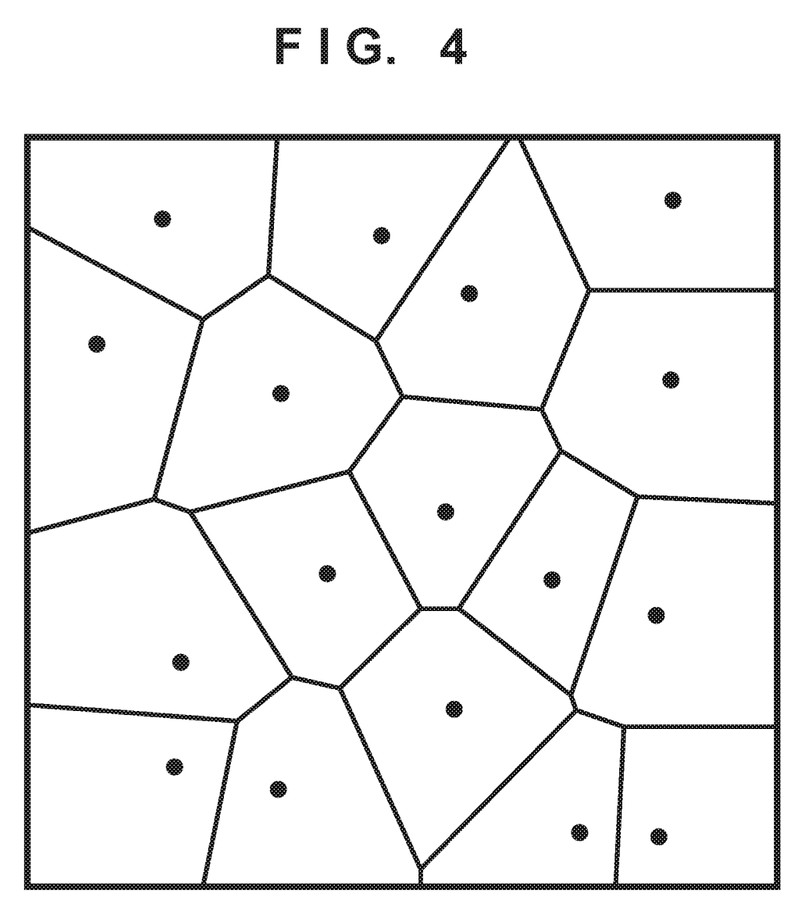
FIG. 4 is a figure for explaining a clustering of virtual lights using k-means clustering.

In the FIS by Krivanek et al., for a decided sample point, value obtainment is performed from an image of a mip level referenced in accordance with the probability density of the sample point. Because a parameter of a composite light is obtained from an average value of pixels in an RSM cluster in the present invention, it can be thought that approximate clustering with overlaps or gaps can be realized by using FIS. However actually, in a case where the FIS of Krivanek et al. is simply replaced by k-means clustering and applied, there are cases where a suitable luminance computation result is not obtained. This is because, in a case where a cluster size (which corresponds to a mip level) is determined in accordance with a value (probability density) of a center point of a cluster that has been set in the importance map which is a two-dimensional distribution of the PDF, unlike a case where clustering without overlapping or gaps is performed by k-means clustering as shown in FIG. 4, a level of gaps or overlapping for clusters can become extremely large.

Figure 5A:
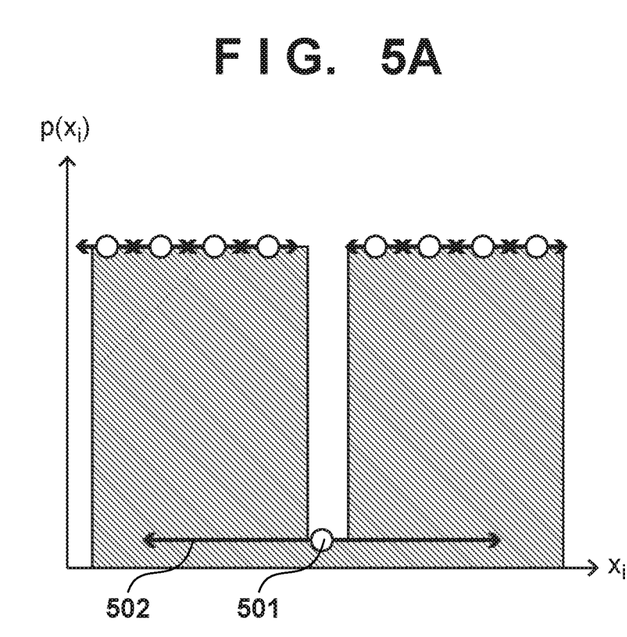
FIGS. 5A and 5B are figures for explaining clustering of virtual lights according to an embodiment of the present invention.

For example, if sample points (circles) are set as illustrated in the figure such that distribution of one dimension (x direction) of the PDF is as illustrated by intermediate color in FIG. 5A, because importance is low at a sample point 501 for which a probability density has sharply decreased, a cluster size 502 becomes large. In other words, overlapping occurs among the sample point 501 and neighboring sample points for clusters that include these points in a region thereof. As a result, if one composite virtual light is defined for a cluster, there is a possibility that the composite virtual light for the sample point 501 will cause an unnatural increase in energy, and a good approximation is not obtained (an error with respect to an ideal value increases). In other words, if there is a difference in probability density between sample points that have been set, because one VPL can be classified into a plurality of clusters by a method that applies an FIS, there is a possibility of a flicker occurring such that a specific pixel blinks, such as when a sample point changes between frames. This is because, if the probability densities in all clusters are totaled, it may exceed the maximum value of 1.

If the FIS technique is applied instead of k-means clustering to clustering of lights, gaps between clusters can occur due to not only overlapping of clusters, but also depending on the area of a rectangular region (cluster) determined in accordance with the position of a sample point set and the probability density of the point. That is, even if a plurality of VPLs for a scene is approximated to a smaller number of composite virtual lights, a VPL that is not considered could be generated. Specifically, a difference can occur between a summation of energies of composite virtual lights for all clusters and a summation of energies of the plurality of VPLs for a scene, and as a result, an approximate solution that has an error with respect to an ideal luminance value will be obtained in luminance computation processing. This is because, if the probability densities in all clusters are totaled, it will not become the maximum value of 1.

The PC 100 of the present embodiment performs clustering processing so that the total of the probability densities for all clusters is 1 and the summation of the probability densities in a cluster is the same for each sample point, so as to be able to reduce the error with respect to an ideal value due to such approximation. That is, so that the summation of the probability densities in each cluster is the reciprocal of the number of samples, in other words the reciprocal of the number of clusters, the area of a cluster for a sample point is decided based on the following equation.

$$\int_{\Omega_i} p(x)dx = \frac{1}{N} \quad (1)$$

Where $\Omega_i$ indicates one cluster, and N denotes the number of clusters or the number of samples.

Figure 5B:
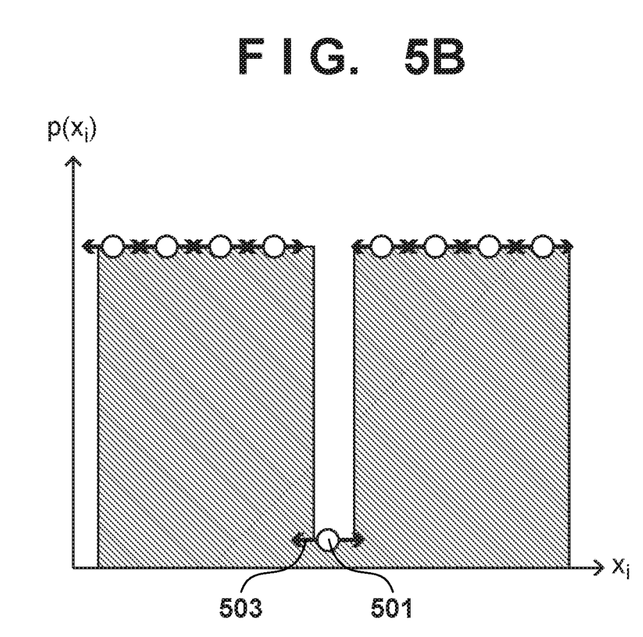
Figure 6:
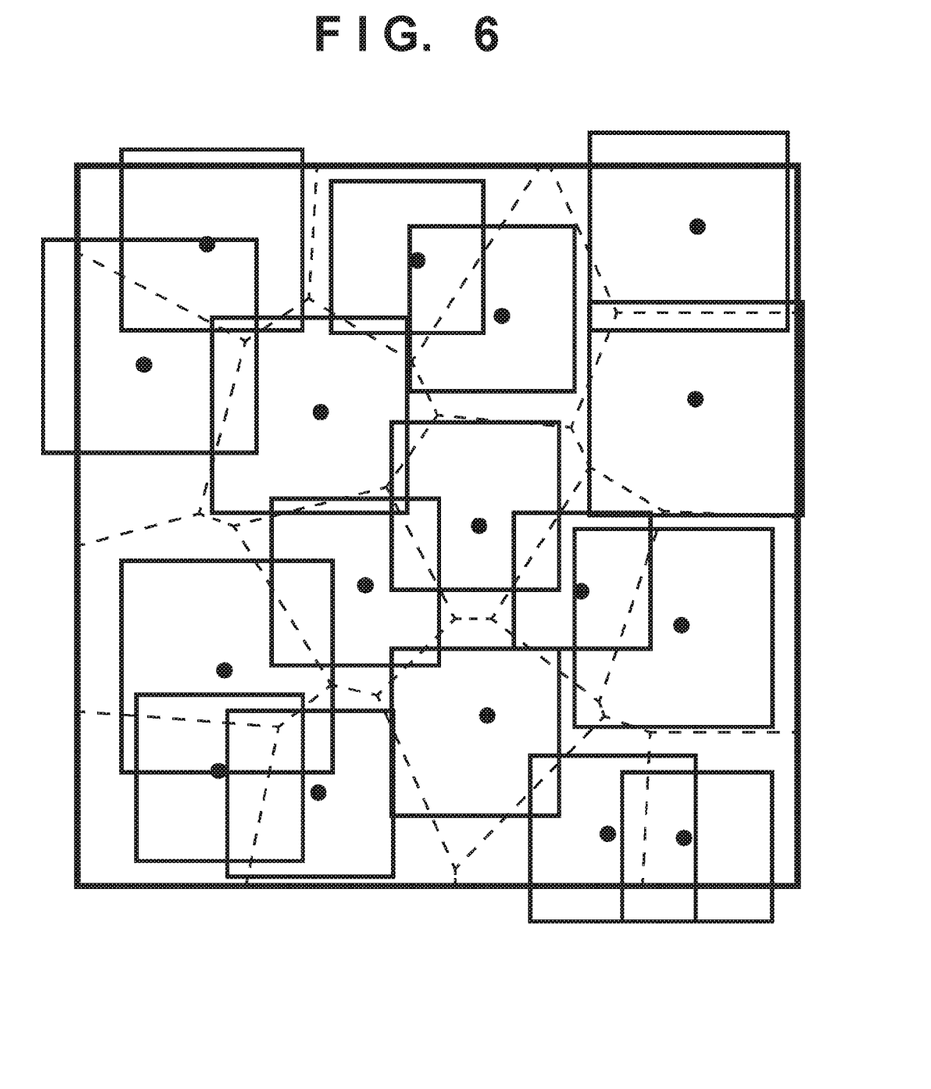
FIG. 6 is another figure for explaining clustering of virtual lights according to an embodiment of the present invention.

With such a configuration, even in the case that the probability density of a set sample point is small in comparison to sample points in a vicinity as in FIG. 5A, a cluster size 503 is decided in accordance with the distribution of a PDF of the vicinity of the sample point, as illustrated in FIG. 5B. As a result, it is possible to reduce overlap between clusters. Although gaps or overlapping between clusters can occur as illustrated in FIG. 6, because an area is decided so that the summation of the probability densities in each cluster becomes 1/N, a probability density of 1 (100%: for the entire scene) is guaranteed in total if a summation computation can be performed for all samples in a luminance computation. Here, regarding the area defined for each cluster, there is an area close to in the case where clustering without gaps or overlapping is performed as in FIG. 4, and the summation of the areas of all clusters is approximately equal to the area of the importance map.

Accordingly, in the PC 100 of the present embodiment, in processing for generating composite virtual lights for virtual lights, a value that is to become a composite virtual light parameter is not simply obtained from an environment map or an RSM of a mip level corresponding to the probability density of sample points included in each cluster as in FIS, but rather is obtained from a mip level map that considers the summation of the probability densities in a cluster. More specifically, a cluster is decided for each sample point so that the summation of the probability densities in each cluster in the importance map becomes the reciprocal of the number of clusters (Equation 1). Here, the cluster size is approximated as below by using a mip level for which an association is made with an environment map or an RSM referred to in composite virtual light parameter obtaining $$\int_{\Omega_i} p(x)dx = 4^{l_i} p(x_i, l_i) = \frac{1}{N}$$

Here, the importance map is configured with a number of pixels that are the same as the maximum resolution of the environment map or the RSM to use, and it is mipmapped similarly to the environment map or the RSM. Specifically, because by also mipmapping the importance map it is possible to obtain a summation of the probability densities in a specific square region from pixels of a corresponding mip level, it is possible to solve the mip level $l_i$ from the above equation by a bisection. Because the mip level of the importance map mipmapped in this way corresponds to the mip level of the map for the obtaining of composite virtual light parameters, after the size of the cluster has been specified by the mip level, similarly to FIS it is possible to easily obtain parameters from the RSM or the like for the mip level.

In addition, by using the $l_i$ obtained in this way, it is also possible to similarly approximate a summation of energies q in each cluster as $$\int_{\Omega_i} q(x)dx = 4^{l_i} q(x_i, l_i) = \frac{q(x_i, l_i)}{N \cdot p(x_i, l_i)}$$

<Composite Virtual Light Generation Processing>

Figure 2:
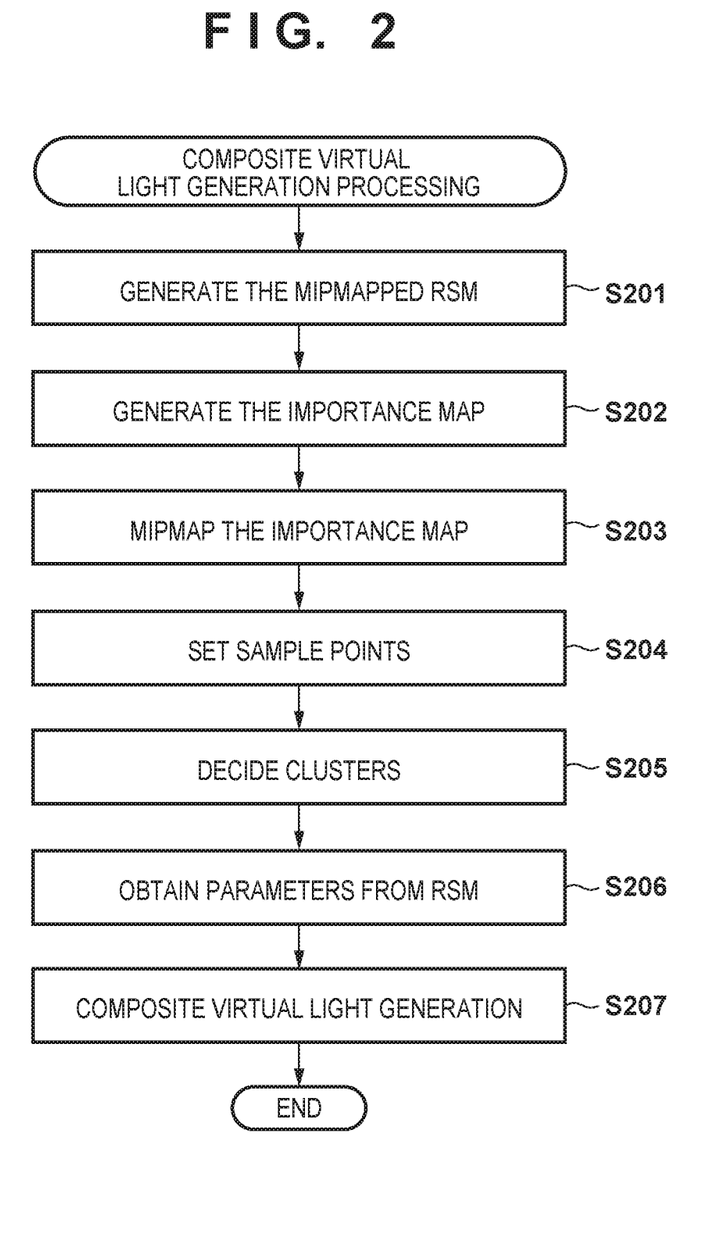
FIG. 2 is a flowchart for exemplifying composite virtual light generation processing executed by the PC 100 according to an embodiment of the present invention.

Regarding composite virtual light generation processing, which is executed in the PC 100 of the present embodiment, detailed processing is explained using the flowchart of FIG. 2. Processing that corresponds to this flowchart can be realized by the control unit 101 reading a corresponding processing program stored in the storage medium 102 for example, loading it into the memory 103, and executing it. Note that the present composite virtual light generation processing is explained as something that is executed prior to shading for a screen. In addition, the following composite virtual light generation processing is explained as something that obtains various parameters of a virtual light by referring to an RSM.

In step S201, the rendering unit 104 generates a mipmapped RSM that includes information of virtual lights (VPLs) defined for a scene to be rendered. The RSM has a channel of various parameters, such as the roughness of a surface, a degree of reflection, a normal, and a depth, that are required for computation of a reflection for shading of a scene to be rendered.

In step S202, the rendering unit 104 generates an importance map, which is a two-dimensional distribution of a PDF in accordance with predetermined criteria, for the scene to be rendered. As described above, what to have as criteria for the importance may be something determined by a designer for each application, for example. The importance map generated in this step is something generated in accordance with the RSM, and has the same number of pixels as the maximum resolution of the RSM.

In step S203, the rendering unit 104 mipmaps the importance map generated in step S202.

In step S204, to reduce the number of virtual lights to consider in a computation, the clustering unit 105 sets sample points for which to generate composite virtual lights on the importance map (maximum resolution). Setting of the sample points is performed in accordance with distribution of the probability density, and the clustering unit 105 sets sample points for only a number (N) of predetermined clusters.

In step S205, the clustering unit 105 decides clusters so that a summation of internal probability densities becomes 1/N for each sample point. For each sample point, the clustering unit 105 references pixels that correspond to a region, from the mipmapped importance map, that includes the sample point while successively changing the mip level, to search for a mip level for which the summation of the probability densities of the region becomes 1/N.

In step S206, based on the mip level found for each sample point, the clustering unit 105 obtains various parameters required for composite virtual light generation from the pixels corresponding to the mipmapped RSM. As described above, because the RSM and the importance map of the present embodiment are mipmapped from images having the same maximum resolution, the clustering unit 105, for each sample point, obtains parameters from a pixel at a position corresponding to the RSM of the mip level obtained by the search.

In step S207, the clustering unit 105 generates a composite virtual light for each sample point, based on the various parameters obtained. The composite virtual light may be something that expresses a plurality of VPLs defined in a cluster as one virtual spherical light, for example, and the obtained parameters are used in setting of various parameters for a virtual spherical light. In the PC 100 of the present embodiment, a method that defines a composite virtual light as a virtual spherical Gaussian light (VSGL: Virtual Spherical Gaussian Light) that approximates, by a spherical Gaussian, a spread (corresponds to the area of the cluster) of the composite virtual light and a BRDF of the sample point is used to optimize computation in later described luminance computation processing. A method that performs a spherical Gaussian approximation to perform a radiance computation is disclosed in Yusuke Tokuyoshi, "Virtual spherical gaussian lights for real-time glossy indirect illumination", SIGGRAPH Asia 2014 Technical Briefs, Article No. 17, pp. 1-4. Note that there is no need to define a composite virtual light by VSGL, and it goes without saying that it may be defined by a method used in conventional light clustering.

By the present composite virtual light generation processing, in a method that performs a luminance computation for indirect illumination that uses an RSM, it is possible to approximate a plurality of VPLs defined in the RSM by a predetermined number of VSGLs in accordance with a distribution of probability densities thereof, and it is possible to reduce the computation amount. In addition, because it is possible to simply determine a cluster by obtaining values from a mipmapped importance map, it is possible to reduce a computation amount more than a case of using k-means clustering to calculate a distance between a set center point of a cluster and each pixel every time. Furthermore, in the composite virtual light generation processing of the present embodiment, rather than simply applying FIS to determine a cluster size, because a cluster size is determined so that 1 is not exceeded if the summation of the probability density in a cluster is totaled for all clusters, it is possible to reduce error according to light approximation.

<Luminance Computation Processing>

Figure 3:
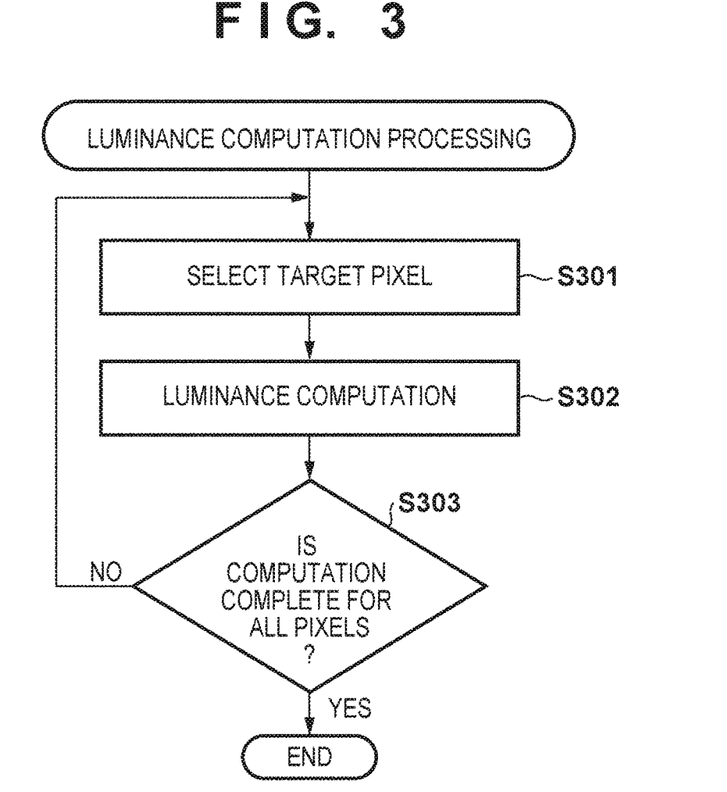
FIG. 3 is a flowchart for exemplifying luminance computation processing executed by the PC 100 according to an embodiment of the present invention.

Next, the flowchart of FIG. 3 is used to explain detailed processing for luminance computation processing (shading) that computes a contribution from a cluster number of VSGLs generated by composite virtual light generation processing. Processing that corresponds to this flowchart can be realized in the luminance computation unit 106 by the control unit 101 reading a corresponding processing program stored in the storage medium 102 for example, loading it into the memory 103, and executing it. Note that the present luminance computation processing is explained as something that is started after information of objects to be rendered at each pixel of a screen to generate, for example, has been finalized.

In step S301, the luminance computation unit 106 selects, from the screen to render, a pixel (a target pixel) for which an influence of luminance caused by an indirect light has not yet been computed.

In step S302, the luminance computation unit 106 computes a radiance of the target pixel based on contributions to the target pixel from each of the generated VSGLs, and stores a result. The radiance is obtained by analytically solving the rendering equation for each VSGL.

In step S303, the luminance computation unit 106 determines whether computation of luminance caused by indirect lights has completed for all pixels of the screen to render. The luminance computation unit 106 terminates the present luminance computation processing if it determines that computation has completed, and returns the processing to step S301 if it determines that computation has not completed.

In this way, by performing composite virtual light generation processing and luminance computation processing that considers contributions for only the composite virtual lights generated by the composite virtual light generation processing, reduction of the computation amount for performing a rendering expression for the indirect illumination as a whole is realized.

[Variation]

In the above described embodiment, explanation was given of using a mipmapped importance map to search a summation of the probability densities of each cluster when deciding which mip level for the RSM from which parameters are obtained. Here, pixels of each mip level correspond to a square region in the map, and there was an aspect in that it is easy to approximate a spread (a shape) as a spherical composite virtual light, but the implementation of the present invention is not limited to the aforementioned methods. In a search that uses an importance map, the present invention can be applied if using a data structure that enables a summation value of pixels in a predetermined rectangular region to be easily (in constant time) obtained, and the present invention can realize reduction of a computation amount even if using a Summed Area Table (SAT) for example.

Note that a case of using a SAT differs to a case in which a region corresponding to pixels of each mip level is fixed, as in a mipmap, and because it is possible to dynamically set a rectangular shape and it is possible to strictly obtain a summation value for the rectangular region, it is possible to obtain an approximation result that is suitable and has lower overlap.

Other Embodiments

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions. Also, the luminance computation apparatus and the luminance computation method according to the present invention are realizable by a program executing the methods on one or more computers. The program is providable/distributable by being stored on a computer-readable storage medium or through an electronic communication line.

This application claims the benefits of U.S. Patent Provisional Application No. 62/182,762, filed Jun. 22, 2015, and Japanese Patent Application No. 2015-192187, filed Sep. 29, 2015, which are hereby incorporated by reference herein in their entirety.

What is claimed is:

1. A non-transitory computer-readable recording medium on which is recorded a program for causing a computer to, for a luminance computation performed based on a two-dimensional map indicating a space distribution, of a plurality of virtual lights determined for a global illumination of a scene, and a parameter of each virtual light, the luminance computation being performed to approximate the plurality of virtual lights to a smaller predetermined number of composite virtual lights, perform processing to decide a parameter of each of the predetermined number of composite virtual lights, wherein the program comprises:

processing for obtaining an importance map of the scene that is generated to correspond to the two-dimensional map, the importance map having a data structure from which a summation of importances of a requested region can be obtained;

processing for setting, in the importance map, clusters of virtual lights such that a summation of probability densities in each cluster is a reciprocal of a number of clusters, and a composite virtual light being generated for each cluster; and processing for deciding, for each composite virtual light of the predetermined number of composite virtual lights, a parameter of the composite virtual light based on a region of the two-dimensional map that corresponds to the set cluster, wherein a value obtained by totaling, for each composite virtual light of the predetermined number of the composite virtual lights, the summation of the probability densities for the cluster set for each composite virtual light, corresponds to a summation of the importances of an entire region of the importance map.

2. The recording medium according to claim 1, wherein the summation of the probability densities for the cluster set for each composite virtual light corresponds to a value obtained by dividing the summation of the importances of the entire region of the importance map by the predetermined number.

3. The recording medium according to claim 1, wherein the two-dimensional map has the data structure, and the parameter of each composite virtual light is decided based on a summation of parameters of the region of the two-dimensional map that corresponds to the cluster set of the respective composite virtual light.

4. The recording medium according to claim 1, wherein each composite virtual light is a virtual spherical light, centered on a position that defines the respective composite virtual light, determined based on a size of the cluster set for the respective composite virtual light, and a value based on a summation of parameters for the region of the two-dimensional map corresponding to the cluster.

5. The recording medium according to claim 1, wherein the program further causes the computer to execute luminance computation processing for the global illumination of the scene based on the predetermined number of composite virtual lights for which the parameters are decided.

6. The recording medium according to claim 1, wherein the data structure is a mipmap having a plurality of levels having different spatial resolutions, and each pixel value of the mipmap is based on a summation of pixel values of a region, corresponding to the pixel, of a map of a level in the mipmap for which a spatial resolution is highest.

7. The recording medium according to claim 1, wherein the two-dimensional map is a reflective shadow map or an environment map.

8. A luminance computation apparatus for executing a luminance computation performed based on a two-dimensional map indicating a space distribution, of a plurality of virtual lights determined for a global illumination of a scene, and a parameter of each virtual light, the luminance computation being performed to approximate the plurality of virtual lights to a smaller predetermined number of composite virtual lights, the apparatus comprising:

at least one processor; and a memory including a set of instructions that, when executed by the at least one processor, causes the at least one processor to perform operations including:

obtaining an importance map of the scene that is generated to correspond to the two-dimensional map, the importance map having a data structure from which a summation of importances of a requested region can be obtained;

setting, in the importance map, clusters of virtual lights such that a summation of probability densities in each cluster is a reciprocal of a number of clusters, and with a composite virtual light being generated for each cluster; and deciding, for each composite virtual light of the predetermined number of composite virtual lights, a parameter of the composite virtual light based on a region of the two-dimensional map that corresponds to a set cluster, wherein a value obtained by totaling, for each composite virtual light of the predetermined number of the composite virtual lights, the summation of the probability densities for the cluster set for each composite virtual light, corresponds to a summation of the importances of an entire region of the importance map.

9. A luminance computation method for executing a luminance computation performed based on a two-dimensional map indicating a space distribution, of a plurality of virtual lights determined for a global illumination of a scene, and a parameter of each virtual light, the luminance computation being performed to approximate the plurality of virtual lights to a smaller predetermined number of composite virtual lights, the method comprising:

obtaining an importance map of the scene that is generated to correspond to the two-dimensional map, the importance map having a data structure from which a summation of importances of a requested region can be obtained;

setting, in the importance map, cluster of virtual lights such that a summation of probability densities in each cluster is a reciprocal of a number of clusters, and with a composite virtual light being generated for each cluster; and deciding, for each composite virtual light of the predetermined number of composite virtual lights, a parameter of the composite virtual light based on a region of the two-dimensional map that corresponds to a set cluster, wherein a value obtained by totaling, for each composite virtual light of the predetermined number of the composite virtual lights, the summation of the probability densities for the cluster set for each composite virtual light, corresponds to a summation of the importances of an entire region of the importance map.

* * * * *